(12) United States Patent
Kakii

(10) Patent No.: US 8,538,490 B2
(45) Date of Patent: Sep. 17, 2013

(54) MOBILE ELECTRONIC DEVICE

(75) Inventor: Eiji Kakii, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 284 days.

(21) Appl. No.: 13/014,514

(22) Filed: Jan. 26, 2011

(65) Prior Publication Data

US 2011/0183723 A1   Jul. 28, 2011

(30) Foreign Application Priority Data

Jan. 27, 2010   (JP) ................... 2010-015490

(51) Int. Cl.
*H04B 1/38* (2006.01)

(52) U.S. Cl.
USPC ............ 455/567; 455/572; 455/573; 455/574

(58) Field of Classification Search
USPC ............. 455/412.1–414.2, 415, 432.1–452.2, 455/466, 566–567, 572–574
See application file for complete search history.

(56) References Cited

U.S. PATENT DOCUMENTS

| 5,708,970 | A  | * | 1/1998  | Newman et al. | 455/701   |
|-----------|----|---|---------|---------------|-----------|
| 2003/0032463 | A1 | * | 2/2003  | Cannon et al. | 455/574   |
| 2006/0023722 | A1 | * | 2/2006  | Jung et al.   | 370/395.4 |
| 2006/0046794 | A1 | * | 3/2006  | Scherschel et al. | 455/575.1 |
| 2010/0120477 | A1 | * | 5/2010  | Imai          | 455/574   |
| 2010/0173600 | A1 | * | 7/2010  | Izumi et al.  | 455/272   |
| 2010/0308744 | A1 | * | 12/2010 | Yang          | 315/287   |

FOREIGN PATENT DOCUMENTS

| JP | 2002-051135 A | 2/2002 |
| JP | 2007-074181 A | 3/2007 |

\* cited by examiner

*Primary Examiner* — Dai A Phuong
(74) *Attorney, Agent, or Firm* — Procopio, Cory, Hargreaves & Savitch LLP

(57) ABSTRACT

A system and method for operating a mobile electronic device is disclosed. An intermittent reception is performed to reduce or minimize power consumption during a sleep mode while the mobile electronic device is communicating with at least one base station. At least a first voltage is provided on a chip-enable terminal of an LED driving circuit to cause an LED to blink after the intermittent reception.

15 Claims, 9 Drawing Sheets

600

MOBILE ELECTRONIC DEVICE

CROSS-REFERENCE TO RELATED APPLICATION

The present application claims priority under 35 U.S.C. §119 to Japanese Patent Application No. 2010-015490, filed on Jan. 27, 2010, entitled "MOBILE ELECTRONIC DEVICE". The content of which is incorporated by reference herein in its entirety.

FIELD

Embodiments of the present disclosure relate generally to mobile electrical devices, and more particularly relate to reducing power consumption in a mobile electronic device.

BACKGROUND

Some mobile electronic devices blink their light emitting diodes (LEDs) to indicate an incoming call when the incoming call arrives. The Central Processing Unit (CPU) of the mobile electronic devices must be activated to allow an LED to blink. Activation of the CPU may cause high power consumption in a mobile electronic device since the CPU may be kept active for a long period of time to keep the LED on for the long period of time. Hence there is a need for mobile electronic devices in which power consumption is low even if their LEDs are turned on for long periods of time.

SUMMARY

A system and method for operating a mobile electronic device is disclosed. An intermittent reception is performed to reduce power consumption while communicating with at least one base station during a sleep mode. At least a first voltage, a first current or a first power is provided on a chip-enable terminal of an LED driving circuit to cause an LED to blink after the intermittent reception ends.

In an embodiment, a mobile electronic device comprises a light emitting diode (LED), an LED driving circuit, and a controller. The LED driving circuit comprises a chip-enable terminal, and is operable to enable the LED to blink, if a received communication signal is waiting to be accessed by a user. The controller is operable to control radio communication with at least one base station, and reduce power consumption during a sleep mode by intermittently receiving received communication signals in a predetermined period of time from the at least one base station. The controller is further operable to provide at least a first voltage, a first current or a first power on the chip-enable terminal to cause the LED to blink after an intermittent reception.

In another embodiment, a method operates a mobile electronic device. Intermittent reception is performed to reduce power consumption while the mobile electronic device is communicating with at least one base station during a sleep mode. At least a first voltage is provided on a chip-enable terminal of an LED driving circuit to cause an LED to blink after the intermittent reception.

BRIEF DESCRIPTION OF THE DRAWINGS

Embodiments of the present disclosure are hereinafter described in conjunction with the following figures, wherein like numerals denote like elements. The figures are provided for illustration and depict exemplary embodiments of the present disclosure. The figures are provided to facilitate understanding of the present disclosure without limiting the breadth, scope, scale, or applicability of the present disclosure. The drawings are not necessarily made to scale.

DETAILED DESCRIPTION

The following description is presented to enable a person of ordinary skill in the art to make and use the embodiments of the disclosure. The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure are described herein in the context of one practical non-limiting application, namely, an information-processing device such as a mobile phone. Embodiments of the disclosure, however, are not limited to such mobile phone, and the techniques described herein may be utilized in other applications. For example, embodiments may be applicable to digital books, digital cameras, electronic game machines, digital music players, personal digital assistance (PDA), personal handy phone system (PHS), lap top computers, TV's, GPS's or navigation systems, pedometers, health equipments, display monitors, and the like.

As would be apparent to one of ordinary skill in the art after reading this description, these are merely examples and the embodiments of the disclosure are not limited to operating in accordance with these examples. Other embodiments may be utilized and structural changes may be made without departing from the scope of the exemplary embodiments of the present disclosure.

Figure 1:
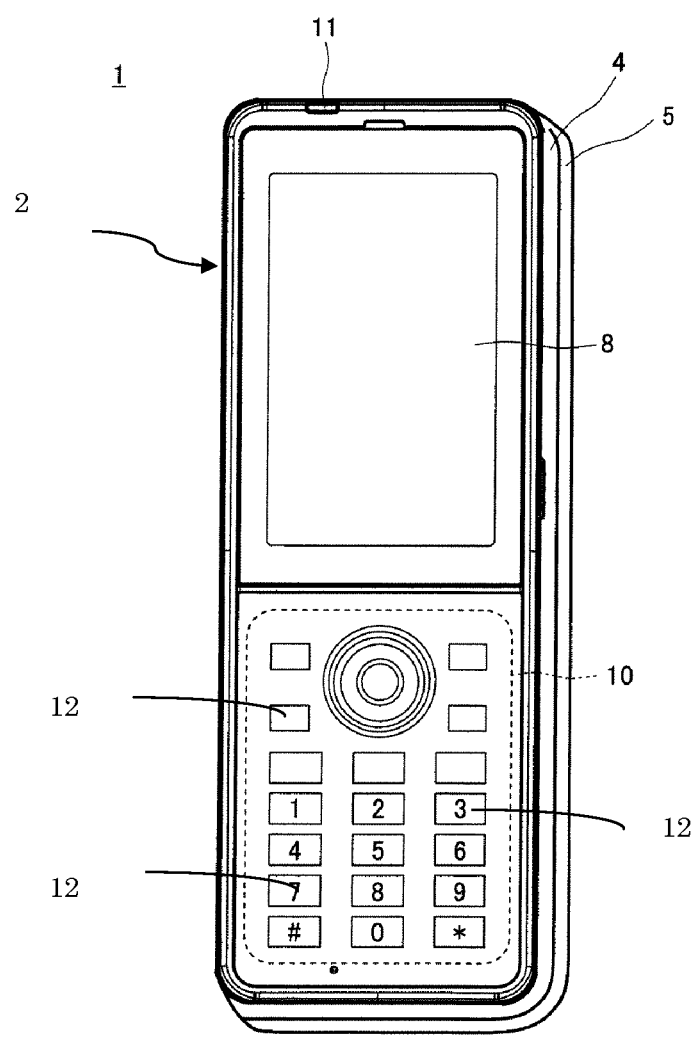
FIG. 1 is a perspective view illustrating a cell phone 1 according to an embodiment of the disclosure.

FIG. 1 is a perspective view illustrating a cell phone 1 according to an embodiment of the disclosure. The cell phone 1 may be a non-folding type and comprises a housing 2. The housing 2 may comprise a front case 4 on which an input module 10 and a display module 8 may be located, and a rear case 5 located on an opposite side of the front case 4. Alternatively, the cell phone 1 may be a folding type and comprises two housings.

The front case 4 and the rear case 5 are coupled to each other using coupling means such as screws, and the like. A space is provided between the front case 4 and the rear case 5 for accommodating various types of electronic parts. The front case 4 and the rear case 5 may comprise resin.

The input module 10 comprises a plurality of input keys 12. A user can press the input keys 12 to command the cell phone 1. In the embodiment shown in FIG. 1, the input module 10 comprises the input keys 12 shown on the front of the front case 4. However, the input module 10 may also comprise side keys and the like located, on a right side, a left side, a top side, a bottom side and a rear side of the cell phone 1.

Figure 2:
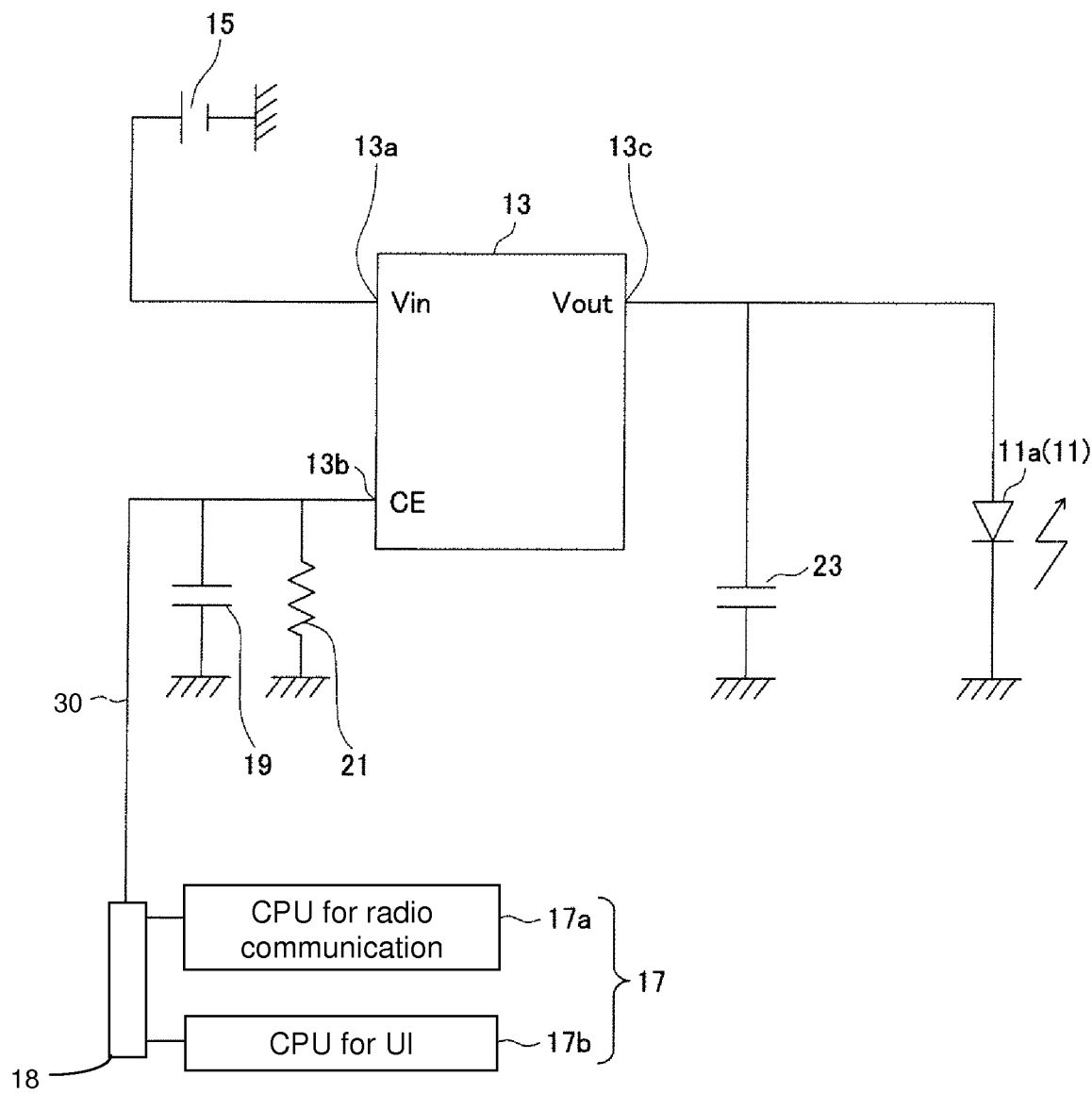
FIG. 2 is an illustration of a circuit to blink an LED according to an embodiment of the disclosure.
Figure 3:
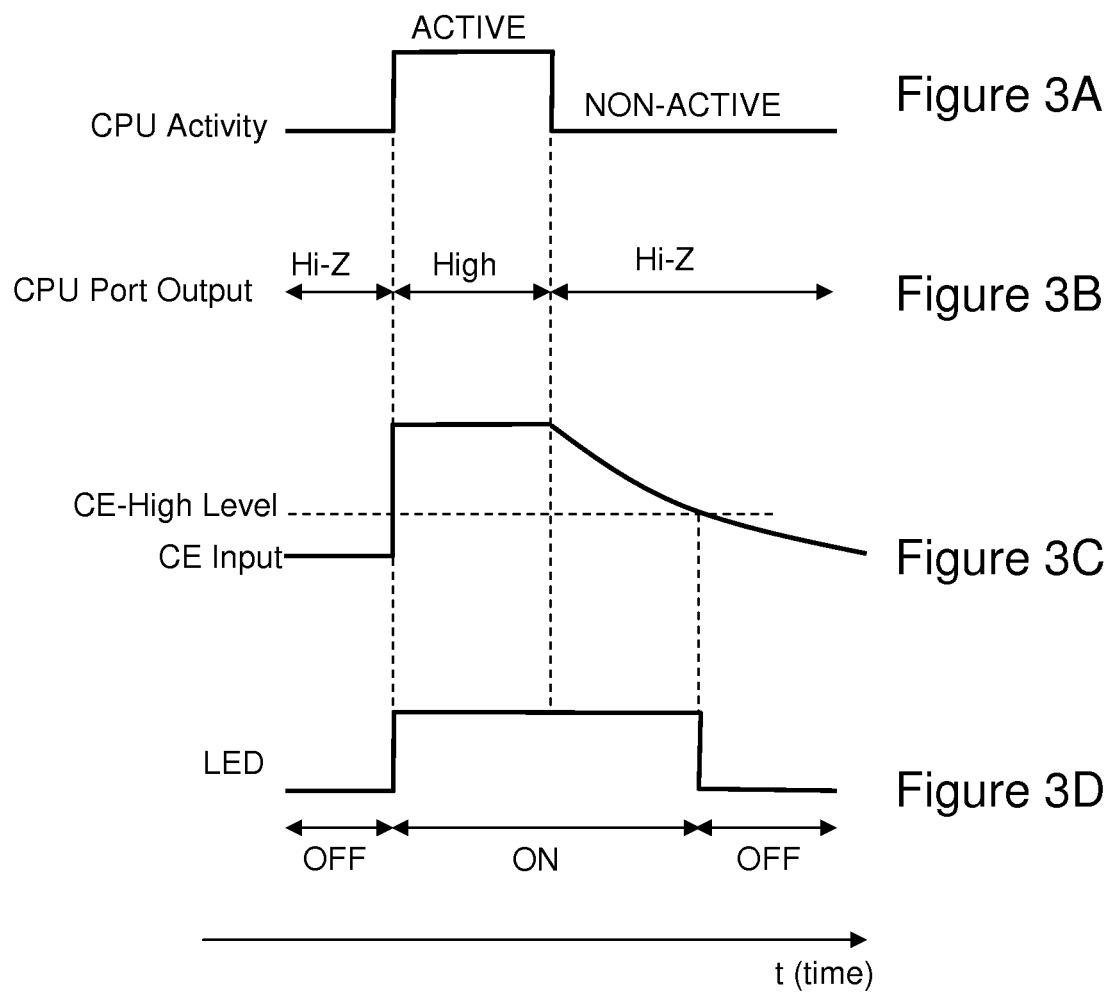
FIGS. 3A-3D are illustrations of an operation of the circuit shown in FIG. 2.

The display module 8 is configured to display various kinds of information via an image/video signal supplied from a controller 17 (FIG. 2). The information may comprise, for example but without limitation, the state of the cell phone 1, user operations, dialling numbers, contents of emails, game screens, and the like. The display module 8 may accept a user input operation to input and transmit data, and input operation commands for functions provided in the cell phone 1. The display module 8 accepts the operation command, and outputs operation command information to the controller 17 in response to the accepted operation command. The display module 8 may be formed by, for example but without limitation, an organic electro-luminescence (OEL) panel, a liquid crystal panel (LCD), an organic light-emitting diode (OLED) and the like.

In this document, a direction toward the front case 4 from the rear case 5 is referred as the front direction (the closer direction in FIG. 1) while the direction toward the rear case 5 from the front case 4 is referred as the back direction (the further direction in FIG. 1).

A side located in the direction toward the display module 8 from the input module 10 is referred as the top side while the side located in the direction toward the input module 10 from the display module is referred as the bottom side. Further, a direction toward the top side is referred as the top side direction (the upward direction in FIG. 1) while the direction toward the bottom side is referred as the bottom side direction (the downward direction in FIG. 1).

Moreover, when viewing the cell phone 1 with the display module 8 at the top and the input module 10 at the bottom, the side on the right is referred as the right side while the side on the left is referred as the left side.

Further, the direction toward the right side is referred as the right side direction (the direction to the right in FIG. 1) while the direction toward the left side is referred as the left side direction (the direction to the left in FIG. 1).

The housing 2 comprises an indicator 11 at the top side direction. The indicator 11 is formed from the face to the top side of the housing 2. The location and shape of the indicator 11 can be modified appropriately according to a given specification, design requirements, and the like. The indicator 11 may comprise transparent or semi-transparent material that transmits light generated inside thereof by an LED 11a (FIG. 2). The indicator 11 indicates, for example but without limitation, incoming calls and incoming emails to the cell phone 1, various states of the cell phone 1, and the like.

For example, in one embodiment, if the user cannot answer incoming calls or emails, the indicator 11 blinks. In this manner, the light generated by the LED 11a may be turned on and off repeatedly at a constant frequency for a certain period of time in order to notify the user of incoming communication signals comprising, for example but without limitation, the incoming calls, the incoming emails, and the like.

To notify the user of the incoming calls and the incoming emails more reliably, the indicator 11 (the LED 11a) may be kept turned on for longer periods of time. The CPU 17 (controller) must also be kept activated for the longer periods of time to turn on the LED 11a.

When notifying the user of the incoming calls and the incoming emails, the CPU 17 is often in sleep mode, to reduce or minimize activation time thereof, thereby reducing power consumption and save a battery life. In order to notify the user reliably by turning on the LED 11a for longer periods of time, the CPU must be activated for long periods of time even when it is in sleep mode.

In one embodiment, the power consumption is reduced as much as possible while keeping the LED 11a turned on for longer period time as explained in more detail below.

FIG. 2 is an illustration of a circuit 200 (circuit 200) configured to blink the LED 11a according to an embodiment of the disclosure. A practical circuit 200 may comprise any number of circuits, any number of processor modules or controllers, any number of memory modules, and any number of display modules. The illustrated circuit 200 depicts a simple embodiment for ease of description. These and other elements of the circuit 200 are interconnected together, allowing communication between the various elements of circuit 200. Those of skill in the art will understand that the various illustrative blocks, modules, circuits, and processing logic described in connection with the embodiments disclosed herein may be implemented in hardware, computer-readable software, firmware, or any practical combination thereof.

To illustrate clearly this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present disclosure.

The circuit 200 comprises a constant current LED driving (constant current) circuit 13, and a CPU 17.

The constant current circuit 13 comprises a power supply terminal 13a (Vin), a constant current chip-enable terminal 13b (CE terminal), and an output terminal 13c (Vout). The constant current LED driving circuit 13 is configured to drive the LED 11a.

Electric power supplied from a battery 15 blinks the LED 11a. The constant current LED driving circuit 13 controls the power supply from the battery 15.

Electric power may be supplied to the Vin 13a from the battery 15. Electric power output from the Vout 13c is controlled to produce a constant current.

The electric power output from the Vout 13c may be controlled by signals supplied to the CE terminal 13b. Specifically, if the electric voltage of the signals supplied to the CE terminal 13b is equal to or greater than a threshold value, electric power is supplied from the Vout 13c to the LED 11a to blink the LED 11a. Conversely, if the electric voltage of the signals supplied to the CE terminal 13b is equal to or less than the threshold value, no electric power is supplied from the Vout 13c to the LED 11a to flash the LED 11a. As explained in more detail in the context of discussion of the FIGS. 3A-3D below, the threshold value may be set to a lowest possible value suitable for operation of the constant current circuit 13.

The CPU 17 (controller) may comprise a CPU 17a for radio communication and a CPU 17b for user interface (UI), and is configured to control a signal input therefrom to the CE terminal 13*b*. In this manner, the CE terminal 13*b* is coupled to a signal output port 18 of the CPU 17, and is controlled by an electric voltage output therefrom.

When coupling the CE terminal 13*b* to the signal output port 18, a capacitor 19 and a resistor 21 are arranged such that an output from the signal output port 18 is not directly supplied to the CE terminal 13*b* as explained in more detail below in the context of discussion of FIG. 3A-3D.

The CPU 17, may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like.

A processor may also be implemented as a combination of computing devices, e.g., a combination of a digital signal processor and a microprocessor, a plurality of microprocessors, one or more microprocessors in conjunction with a digital signal processor core, or any other such configuration. In practice, the CPU 17 comprises processing logic that is configured to carry out the functions, techniques, and processing tasks associated with the operation of the circuit 200. In particular, the processing logic is configured to support operation of the LED 11*a*.

The CPU 17*a* may comprise various kinds of electronic parts, circuits and the like required for radio communication, and is configured to control radio communication. The CPU 17*a* is operable to transmit and receive a plurality of communication signals comprising data signals via a base station. The CPU 17*a* communicates with the wireless network via a wireless data communication link (not shown). The CPU 17*a* cooperates with a base station transceiver (not shown) with a suitably configured RF antenna arrangement (not shown) that can support a particular wireless communication protocol and modulation scheme to transmit and receive the data signals form and to the CPU 17*b*. The data signals may comprise, for example but without limitation, voice data during voice communication (incoming call), image signal, text data during email (incoming email), web data during accessing web site, and the like. The wireless communication protocol and modulation scheme may comprise, for example but without limitation, Code Division Multiple access (CDMA), and the like.

In this manner, the CPU 17*a* may require a large amount of electric power for transmitting electromagnetic waves or the like. Therefore, when the user does not operate the cell phone 1, a sleep mode in which electric power is consumed minimally can be activated therein. Thus, in the sleep mode, power consumption in the CPU 17*a* for radio communication is reduced or minimized.

For example, the circuit 200 may periodically (e.g. every 1200 ms) perform intermittent reception for receiving communication signals from base stations. In this manner, the circuit 200 can check whether any call is to be received or any email is to be received. When a call or an email is received, the circuit 200 may notify the user of receiving the call or the email by, for example but without limitation, displaying a message on the display module 8, by blinking the indicator 11, or the like.

The CPU 17*b* is configured to support functions of the circuit 200. The CPU 17*b* may control operations of the circuit 200 such that processes of the circuit 200 are suitably performed. The CPU 17*b* is configured to control the input module 10, the display module 8, and the like.

A capacitor 23 may be coupled in parallel with the LED 11*a*. In this manner, after electric power is no longer supplied from the Vout 13*c*, the LED 11*a* can be blinked using the electric power stored in the capacitor 23.

FIGS. 3A to 3D are illustrations of an operation of the circuit 200 shown in FIG. 2. FIG. 3A shows activity changes of the CPU 17 from the beginning to an end of the intermittent reception performed by the CPU 17. FIG. 3B shows state changes of output from the signal output port 18 of the CPU 17 from a beginning to an end of an intermittent reception performed by the CPU 17. FIG. 3C shows the state changes of electric voltage supplied to the CE terminal from the beginning to the end of the intermittent reception performed by the CPU 17. FIG. 3D shows the state changes of the LED 11*a* lighting from the beginning to the end of the intermittent reception performed by the CPU 17.

As shown in FIG. 3A, when the CPU performs the intermittent reception during the sleep mode, the CPU 17 changes to an active state and then changes to a non-active state after a certain period of time. In this manner, the signal output port 18 of the CPU 17 is changed from a high impedance (Hi-Z in FIG. 3A), where the impedance is high, to a high voltage level (High in FIG. 3A) where a voltage at at least a first predetermined voltage level is output when the CPU 17 performs intermittent reception as shown in FIG. 3A.

When ending the intermittent reception, the setting of the signal output port 18 of the CPU 17 is changed from the high voltage level to the high impedance (Hi-Z in FIG. 3A) where the impedance is high.

An existing signal output port comprises a setting for a high level (High) and a low level (Low). In contract according to an embodiment the disclosure, the CPU 17 comprises the Hi-Z, where the impedance is high, instead of Low. For the existing signal output port, when the low level is set, the input to a CE terminal 13*b* coupled to the signal output port is at a low level. In contrast, according to an embodiment of the disclosure, the CE terminal 13*b* is coupled to the signal output port 18 comprising the Hi-Z. Therefore, due to the high impedance, even if no electric power is supplied to the signal output port 18, the CE terminal 13*b* coupled to the signal output port 18 will not become low (standard voltage) immediately because the electric power (charge) stored in the capacitor 23 is used.

If the capacitor 19 and the resistor 21 are located between the signal output port 18 and the CE terminal 13*b* as shown in FIG. 2, the input to the CE terminal 13*b* will decrease gradually as shown in FIG. 3C. In other words, when the CPU 17 is no longer activated as the intermittent reception is completed, even if the signal output port 18 is changed from High to Hi-Z, the input to the CE terminal 13*b* decreases gradually as shown in FIG. 3C.

The constant current circuit 13 continues to supply power to the LED 11*a* until Vout 13*b* of the constant current circuit 13 fall below a CE-High level. The CE-High level is a threshold value at which electric power is supplied to the LED 11*a* depending on the voltage at the CE terminal 13*b*. Hence, the LED 11*a* can continue blinking for a while even after the CPU 17 ends the intermittent reception as shown in FIG. 3D.

The CE-High level voltage (enabling voltage) that enables the chip-enable on the LED driving circuit should be lower than the high level voltage at the CPU 17. Therefore, enough voltage can be generated to enable the CE terminal 13*b* to operate only via the signal output port 18 of the CPU 17. The CPU 17 maintains the sleep mode while it is set to Hi-Z. In this manner, the sleep mode can be maintained for a long period of time.

Rate of change of gradual decrease of the input to the CE terminal 13*b* as shown in FIG. 3C can be changed by varying a time constant of the capacitor 19 and the resistor 21. Therefore, by changing values of the capacitor 19 and the resistor 21 accordingly, the LED 11a can be blinked for any desired period of time. If a capacity of the capacitor 19 is set at a design stage and the like, a blinking time of the LED 11a can be adjusted to any time.

If the CE-High level is adjusted as low as possible, the LED 11a can be blinked for a long period of time.

Figure 4:
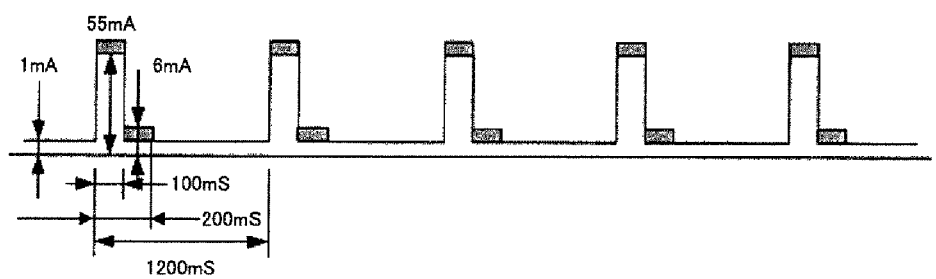
FIG. 4 illustrates the CPU activity states according to an embodiment of the disclosure.

FIG. 4 illustrates the CPU activity states according to an embodiment of the disclosure. An interval of the intermittent reception may be about 1200 ms, a period during the intermittent reception may be about 100 ms, and the period during blinking of the LED 11a may be about 200 ms. An electric current required for the cell phone 1 while no intermittent reception is performed in the sleep mode is set to 1 mA, the electric power required for the cell phone 1 during the intermittent reception is set to 55 mA, and the electric power required for the cell phone 1 to keep blinking the LED 11a after finishing the intermittent reception is set to 6 mA. In this case, the average electric current per cycle of 1200 ms is about 5.91 mA for the circuit 200.

Figure 8:
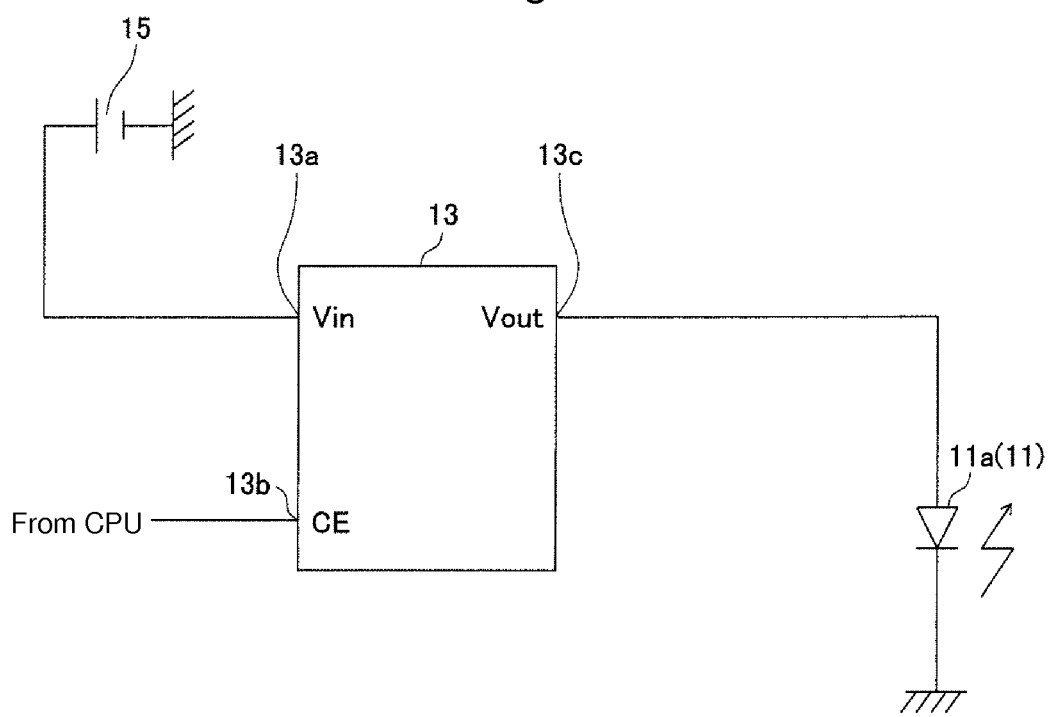
FIG. 8 is an illustration of an existing circuit to blink an LED.

In contrast, in an existing circuit shown in FIG. 8, the average electric current per cycle of 1200 ms is about 9.17 mA, if the intermittent reception period is 200 ms to blink the LED 11a for 200 ms. Therefore, according to an embodiment of the disclosure, the circuit 200 can be activated with power that is 64.5% (=5.91/9.17*100) of the existing circuit shown in FIG. 8.

Figure 5:
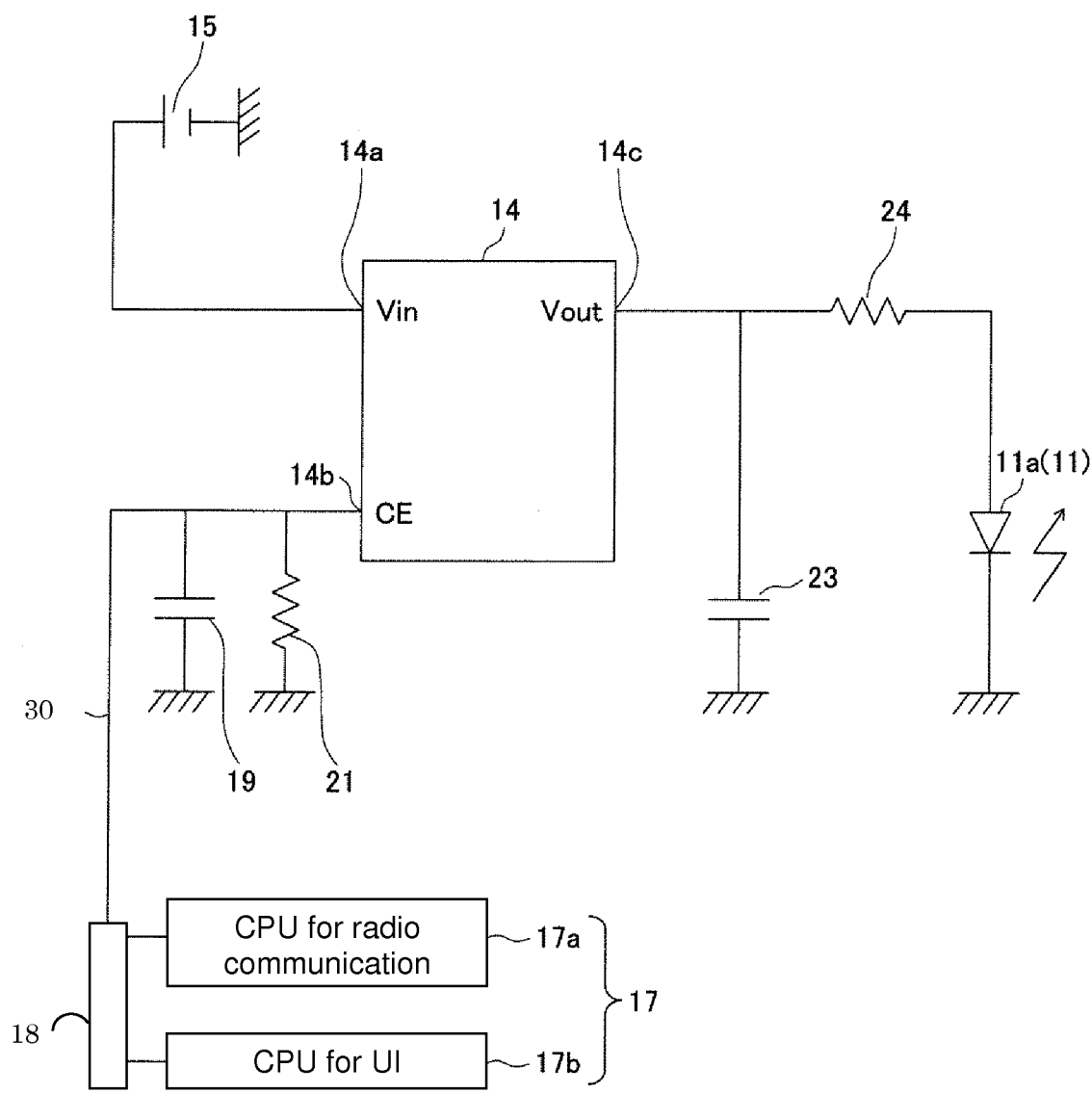
FIG. 5 is an illustration of a constant voltage LED driving circuit according to an embodiment of the disclosure.

FIG. 5 is an illustration of a constant voltage LED driving circuit 500 (circuit 500) comprising a constant voltage LED driving circuit 14 according to an embodiment of the disclosure. The circuit 500 may have functions, material, and structures that are similar to the circuit 200. Therefore common features, functions, and elements may not be redundantly described here.

Since the constant voltage LED driving circuit 14 is a constant voltage circuit, a resistor 24 is coupled between the LED 11a and the constant voltage LED driving circuit 14. The resister 24 will determine a value of current flowing out from Vout. The constant voltage LED driving circuit 14 (LED driving circuit 14) controls the LED 11a in a similar way to the constant current circuit 13 in FIG. 2.

Figure 6:
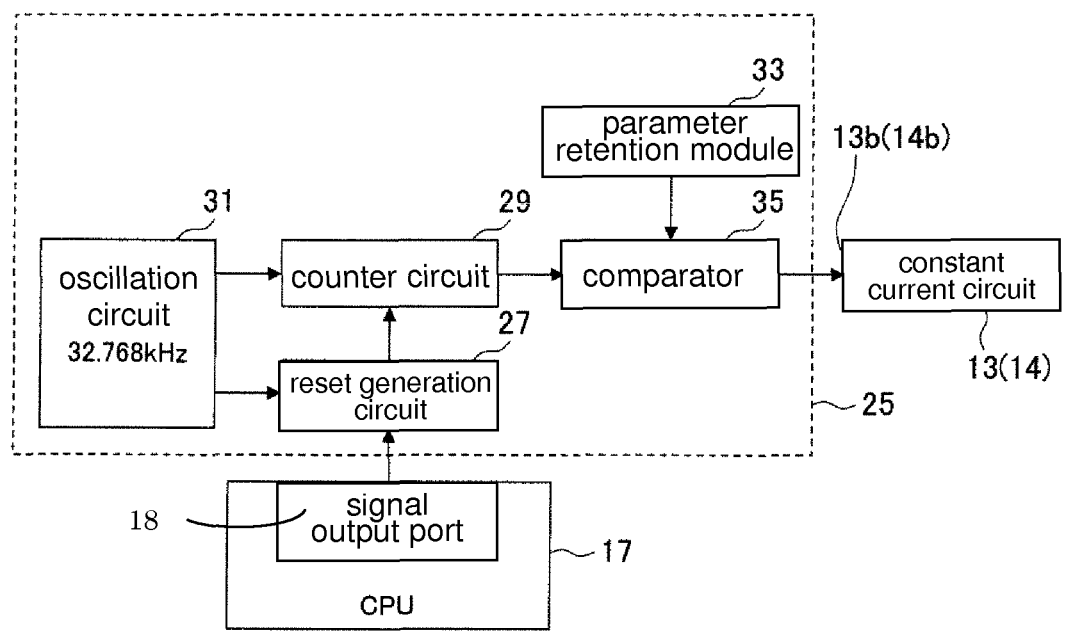
FIG. 6 is an illustration of an exemplary functional block diagram of a blinking time extension system according to an embodiment of the disclosure.
Figure 7:
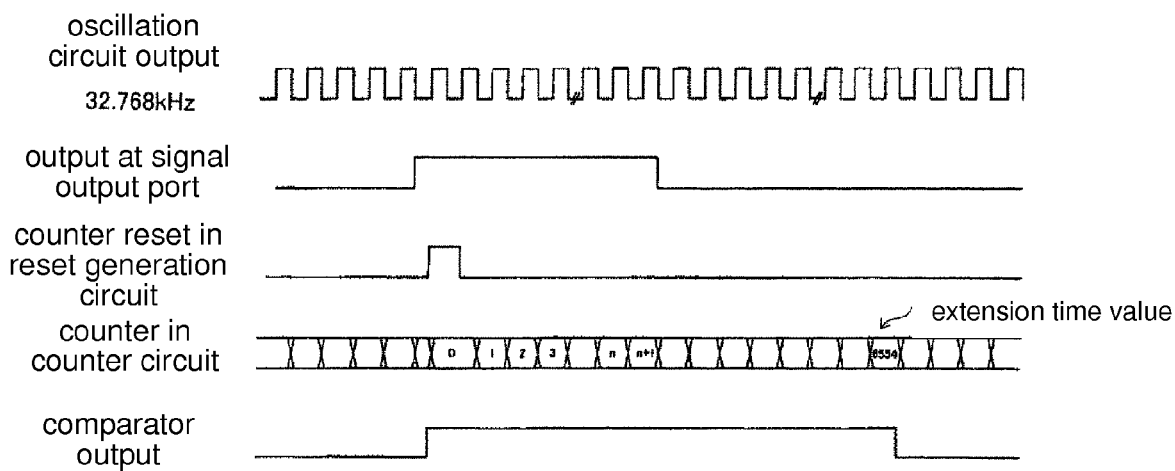
FIG. 7 is an illustration of an exemplary signal generation by the system of FIG. 6.

FIG. 6 is an illustration of a functional block diagram of a blinking time extension system (system 600) according to an embodiment of the disclosure. FIG. 7 is an illustration of an exemplary signal generation by the system 600 according to an embodiment of the disclosure. The system 600 may have functions, material, and structures that are similar to the circuit 200. Therefore common features, functions, and elements may not be redundantly described here.

A control signal extension circuit 25 is coupled between the signal output port 18 on the CPU 17 and the CE terminal (13b/14b) of the LED driving circuit 13/14 connection line 30. In an embodiment, the constant voltage LED driving circuit 14 may be used instead of the constant current circuit 13.

The control signal extension circuit 25 is coupled to the connection line 30. The control signal extension circuit 25 comprises the parameter retention module 33, an oscillation circuit 31, a reset generation circuit 27, a counter circuit 29, and a comparator 35.

The parameter retention module 33 is configured to record the extension time as an extension time value. For example, a value recorded may be 6554. The extension time value may be set as a factory default value, or set to any value by the user.

The oscillation circuit 31 is configured to generate pulse signals at a certain frequency. For example, the oscillation circuit 31 may oscillate at 32.768 kHz to generate pulse signals.

The reset generation circuit 27 is configured to generate reset signals after receiving outputs from the signal output port 18. Specifically this is when the output from the signal port changes from a low level to a high level and the like.

The counter circuit 29 is configured to count a number of pulses after receiving the reset signal from the reset generation circuit 27 and outputs the count value to the comparator 35.

The comparator 35 is configured to compare the count value that is output from the counter circuit 29 with the extension time value that is held by the parameter retention module 33. The comparator 35 causes the constant current LED driving circuit 13 or the constant voltage LED driving circuit 14 (LED driving circuit 13/14) to turn on the LED 11a if the extension period value is greater than the count value, and causes the LED driving circuit 13/14 to turn off the LED 11a if the extension period value is smaller than the count value. This configuration in a digital method allows the LED 11a to extend its lighting time.

As explained above, the cell phone 1 comprises the LED 11a that can blink to provide notification of unanswered incoming calls and/or unread emails, and the LED driving circuit 13/14 that drives the LED.

The cell phone 1 comprises the CPU 17 to control radio communication with base stations. The chip-enable terminal on the LED driving circuit 13/14 and the signal output port on the CPU 17 are coupled by the connection line 30.

The CPU 17 performs the intermittent reception while performing radio communication with base stations temporarily in sleep mode for reducing or minimizing power consumption, and maintains the input to the CE terminal (13b/14b) at a certain value or higher to cause the LED 11a to blink.

In this manner, the LED 11a can reduce the power consumption even though it can continue flashing for a while after the CPU 17 finishes the intermittent reception.

The capacitor 19 is configured to determine a blinking time for the LED 11a and is coupled between the connection line 30 and the power ground (not shown) of the LED driving circuit 13/14.

The CPU 17 sets the signal output port 18 to a high level, or a high impedance in which the impedance is high. The CPU 17 sets the signal output port to the high level during the intermittent reception and sets the signal output port to the high impedance (High-Z) when the intermittent reception is finished.

After the intermittent reception ends, the electric charge discharged by the capacitor 19 generates a voltage that is applied to the CE terminal (13b/14b) to cause the LED 11a to blink. This configuration in an analog method allows the LED 11a to extend its lighting time.

The CPU 17 can maintain the sleep mode while it is set to the high impedance (High-Z), and can maintain the sleep mode for a long period of time.

The voltage enabling the chip-enable on the LED driving circuit 13/14 should be lower than the high level of the CPU 17. This configuration allows the circuit 200/500 to generate enough voltage to enable the constant current chip-enable terminal 13b by using only the signal output port of the CPU 17.

Figure 9:
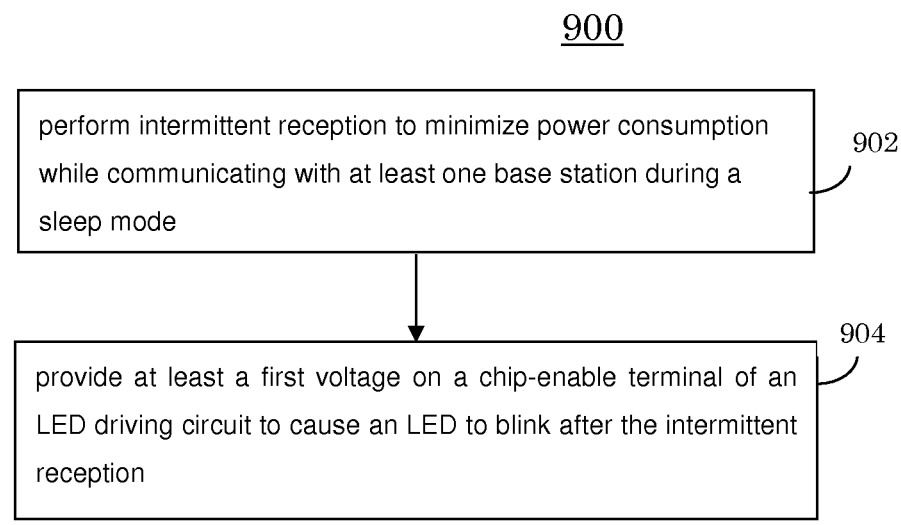
FIG. 9 is an illustration of an exemplary process for blinking an LED according an embodiment of the disclosure.

FIG. 9 is an illustration of an exemplary process 900 for blinking an LED according an embodiment of the disclosure. The various tasks performed in connection with process 900 may be performed, by software, hardware, firmware, a computer-readable medium having computer executable instructions for performing the process method, or any combination thereof. The process 900 may be recorded in a computer-readable medium such as a semiconductor memory, a magnetic disk, an optical disk, and the like, and can be accessed and executed, for example, by a computer CPU such as the CPU 17 in which the computer-readable medium is stored.

It should be appreciated that process 900 may include any number of additional or alternative tasks, the tasks shown in FIG. 9 need not be performed in the illustrated order, and process 900 may be incorporated into a more comprehensive procedure or process having additional functionality not described in detail herein. For illustrative purposes, the following description of process 900 may refer to elements mentioned above in connection with FIGS. 1-7.

In practical embodiments, portions of the process 900 may be performed by different elements of the circuit 200, the circuit 500 and the system 600 such as: the LED driving circuit 13/14, the CPU 17, the control signal extension circuit 25, and the like. Process 900 may have functions, material, and structures that are similar to the embodiments shown in FIGS. 1 to 7. Therefore common features, functions, and elements may not be redundantly described here.

Process 900 may begin by performing intermittent reception to minimize power consumption while communicating with base stations during a sleep mode (task 902).

Process 900 may continue by providing at least a first voltage on a chip-enable terminal (13b/14b) of the LED driving circuit 13/14 to cause the LED 11a to blink after the intermittent reception (task 904)

In this way, a mobile electronic device is provided in which power consumption is low even if LEDs thereof are turned on for long periods of time.

In this document, the terms "computer program product", "computer-readable medium", and the like may be used generally to refer to media such as, for example, memory, storage devices, or storage unit. These and other forms of computer-readable media may be involved in storing one or more instructions for use by the CPU 17 to cause the CPU 17 to perform specified operations. Such instructions, generally referred to as "computer program code" or "program code" (which may be grouped in the form of computer programs or other groupings), when executed, enable an LED blinking method of the circuit 200, the circuit 500 and the system 600.

Terms and phrases used in this document, and variations hereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the present disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. A mobile electronic device, comprising:
    a light emitting diode (LED);
    an LED driving circuit comprising a chip-enable terminal, and operable to enable the LED to blink, if a received communication signal is waiting to be accessed by a user;
    a controller operable to:
        control radio communication with at least one base station;
        reduce power consumption during a sleep mode by intermittently receiving a received communication signal in a predetermined period of time from the at least one base station; and
        maintain at least a first voltage on the chip-enable terminal to cause the LED to blink after an intermittent reception;
    a connection line coupled to the chip-enable terminal and a signal output port of the controller; and
    a capacitor coupled to the connection line and a power ground of the LED driving circuit, wherein the capacitor is operable to set a blinking time for the LED;
    wherein the controller is further operable to cause the LED to blink after the intermittent reception by generating a voltage on the chip-enable terminal using electric power from the capacitor by setting the signal output port to:
    a high level during the intermittent reception; and
    a high impedance after the intermittent reception.

2. The mobile electronic device according to claim 1, wherein the controller is further operable to cause the LED to blink during the intermittent reception.

3. The mobile electronic device according to claim 1, wherein the received communication signal comprises at least one communication signal selected from the group consisting of: an unanswered incoming call, and an unread email.

4. The mobile electronic device according to claim 1, wherein the controller is further operable to maintain the high impedance until a next intermittent reception starts.

5. The mobile electronic device according to claim 1, wherein an enabling voltage of the chip-enable terminal is lower than the first voltage.

6. The mobile electronic device according to claim 1, further comprising a control signal extension circuit coupled to the connection line, and comprising:
    a parameter retention module operable to record an extension time;
    an oscillation circuit operable to generate a pulse signal at a first frequency;
    a reset generation circuit operable to generate a reset signal, if an output is received from a signal output port;
    a counter circuit operable to count a number of pulses of the pulse signal after receiving the reset signal and to output a count value; and
    a comparator operable to:
        compare the count value to the extension time;

cause the LED driving circuit to turn on the LED, if the extension time is greater than the count value; and cause the LED driving module to turn off the LED, if the extension time is less than the count value.

7. The mobile electronic device according to claim 1, further comprising a second capacitor coupled in parallel with the LED.

8. A method for operating a mobile electronic device, the method comprising:
   performing intermittent reception to reduce power consumption while communicating with at least one base station during a sleep mode; and
   maintaining a first voltage on a chip-enable terminal of an LED driving circuit to cause an LED to blink after the intermittent reception;
   coupling a connection line to the chip-enable terminal and a signal output port of a controller
   coupling a capacitor to the connection line and a power ground to set a blinking time for the LED;
      causing the LED to blink after the intermittent reception by generating a second voltage on the chip-enable terminal using electric power from the capacitor by setting the signal output port to:
   a high level during the intermittent reception; and
   a high impedance after the intermittent reception.

9. The method according to claim 8, further comprising blinking the LED, if a received communication is waiting to be accessed by a user.

10. The method according to claim 8, further comprising blinking the LED during the intermittent reception.

11. The method according to claim 8, wherein the intermittent reception is periodically performed.

12. The method according to claim 11, till a next intermittent reception starts further comprising maintaining the high impedance until a next intermittent reception starts.

13. The method according to claim 8, wherein an enabling voltage of the chip-enable terminal is lower than the first voltage.

14. The method according to claim 8, further comprising:
   recording an extension time;
      generating a pulse signal at a first frequency;
      generating a reset signal, if an output is received from the signal output port;
   counting a number of pulses of the pulse signal after receiving the reset signal and output a count value;
   comparing the count value to the extension time;
   turning the LED on, if the extension time is greater than the count value; and
   turning the LED off, if the extension time is less than the count value.

15. The method according to claim 8, further comprising coupling a second capacitor in parallel with the LED.

* * * * *